INVENTORS.
ROBERT W. BICKMORE,
HOWARD E. SHANKS,
BY Noel B. Hammond
AGENT

April 26, 1966  R. W. BICKMORE ET AL  3,248,731
ANTENNA MODULATION TO MODIFY THE DIRECTIONAL
RESPONSE OF RECEIVING SYSTEMS
Filed Dec. 24, 1962  6 Sheets-Sheet 4

INVENTORS.
ROBERT W. BICKMORE,
HOWARD E. SHANKS,
BY
Noel B. Hammond
AGENT

INVENTORS.
ROBERT W. BICKMORE,
HOWARD E. SHANKS,
BY Noel B. Hammond
AGENT.

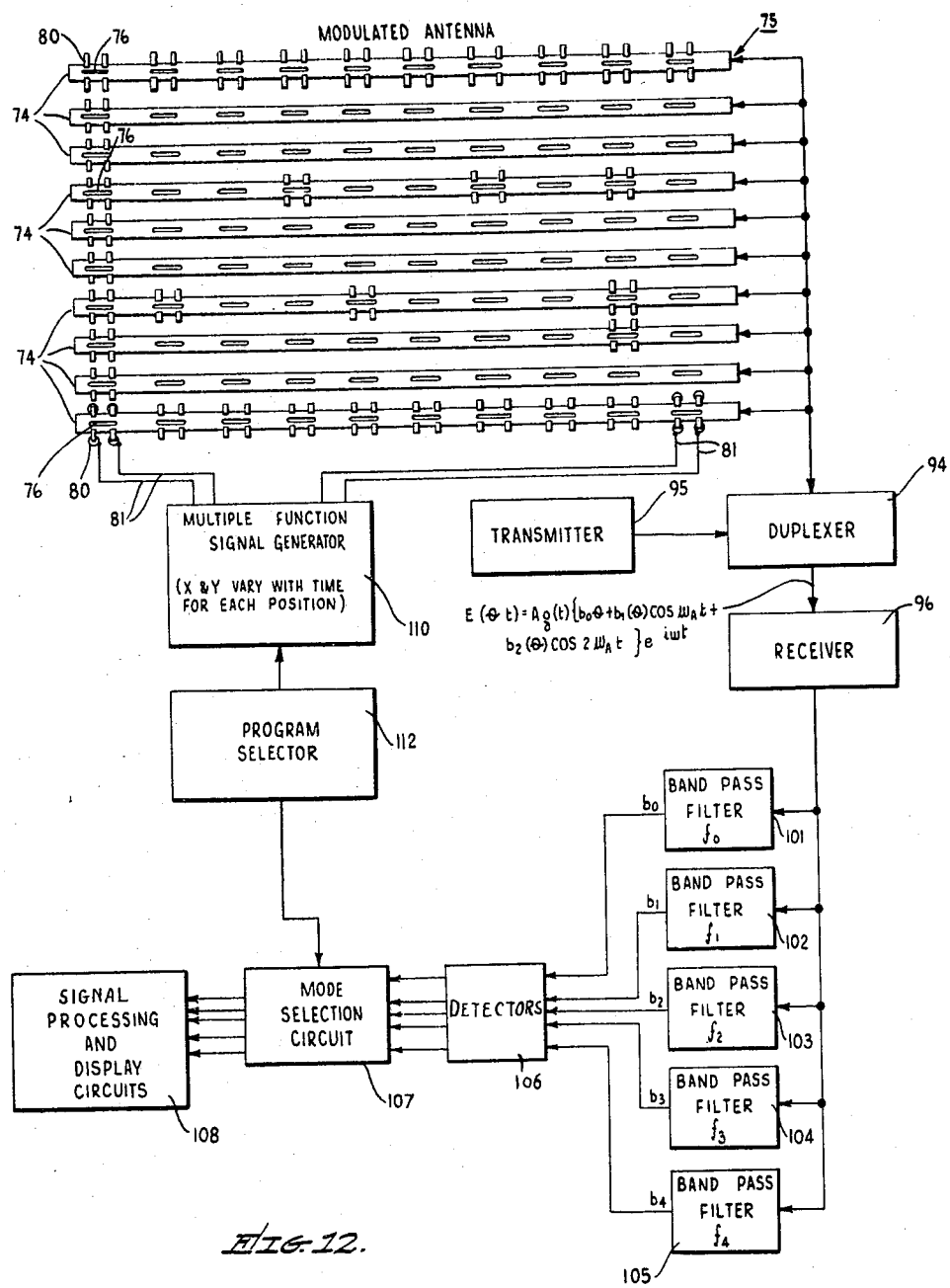

UNITED STATES PATENT OFFICE

United States Patent Office 3,248,731
Patented Apr. 26, 1966

3,248,731
ANTENNA MODULATION TO MODIFY THE DIRECTIONAL RESPONSE OF RECEIVING SYSTEMS
Robert W. Bickmore, Santa Monica, and Howard E. Shanks, San Marino, Calif., assignors to Hughes Aircraft Company, Culver City, Calif., a corporation of Delaware
Filed Dec. 24, 1962, Ser. No. 246,840
10 Claims. (Cl. 343—100)

This is a continuation-in-part of applicant's prior copending U.S. patent application Serial No. 768,668, filed October 21, 1958, now abandoned.

This invention relates to radiant energy receiving systems, and more particularly to apparatus for modulating a parameter of an antenna to introduce modulation components into signals received by the antenna, whereby selected signal components may be utilized to provide modified directional characteristics of the receiving system.

Whereas a single antenna element provides a directional response characteristic of a given shape or pattern, the use of a linear array of such elements can provide material advantages. Thus, the directional response characteristics of a number of antenna elements can be combined into a single beam pattern having a considerable increase in gain in a particular direction compared to that of a single antenna element.

The various techniques for combining radiant energy from a number of antenna elements have limitations, no matter which of the antenna parameters is modified. Consider, for example, the use of a number of antenna elements in a linear array to reduce or suppress side lobe response. The antenna elements must be precisely positioned physically to achieve suppression of side lobes, necessitating s t r i c t manufacturing tolerances. The energy distribution between the various elements may also be varied, but practical considerations as to the precision with which the signals may be controlled impose limitations which cannot be satisfactorily overcome.

The position of the antenna elements with respect to each other may be considered to be another form of parameter modification which is possible, but the directional characteristics are most effectively combined when the elements are closest together. Whereas a number of linear arrays can be combined to form a planar array with some advantages, the combination of a number of planar arrays provides little corresponding improvement in operation.

In recognition of the limitations which are inherent in any antenna system, various signal processing schemes have been proposed and employed to utilize more effectively the signals received. To minimize side lobe response, for example various signal cancellation schemes have been ulilized. These have necessitated extensive additional equipment which at times have almost amounted to a doubling of the equipment which is used.

Therefore, an object of this invention is to provide a radiant energy receiving system which more effectively suppresses side lobe response than the systems heretofore available.

Still another object of this invention is to provide a radiant energy receiving system which can provide a plurality of directional response characteristics.

Yet another object of this invention is to provide a radiant energy receiving system for providing simultaneous operation with a plurality of different directional response characteristics.

Radiant energy receiving systems in accordance with the present invention employ a transducer or antenna which has at least one variable parameter. During the time when the transducer is receiving radiant energy, at least one of the variable parameters of the transducer is varied or modulated in a cyclical fashion. This modulation produces a number of signal components whose characteristics may be described by a Fourier series. Each of the modultion components has associated with it a directional response characteristic or antenna pattern. An individual desired directional response pattern may be extracted by filtering out the related component and rejecting the remainder. Thus there may be derived a plurality of signal components, each associated with a different directional response characteristic or antenna pattern.

In accordance with a feature of this invention, the modulation of antenna parameters may be utilized to achieve significant advances in side lobe suppression. Specifically, a linear antenna array having length as a variable parameter may be provided by utilizing energy switching devices at intermediate points along the length of the antenna. The length is effectively modulated by a control signal which turns the switching devices on and off in cyclic fashion. The modulation component at the frequency of the received signal and corresponding to the D.C. term of the Fourier series representing this square wave modulation, provides a signal having marked improvement in the side lobe level. The effect is similar to that achieved by tapering the aperture distribution, resulting in lowered side lobe levels.

In accordance with another feature of this invention, more than one directional characteristic or antenna pattern may be produced from a single antenna. The patterns may be selected alternatively or simultaneously. In a dual beam system, for example, a different antenna response pattern may be associated with each of two different signal components, and both may be utilized simultaneously through the use of separate filters arranged to select the appropriate components. Another feature is that scanning may be performed because each signal component may be arranged to provide a different directional response with respect to a reference direction. Consequently, on extraction of the individual signal components, each provides a directional response pattern or beam directed toward a different discrete region.

The novel features of this invention, as well as the invention itself, both as to its organization and method of operation, may best be understood when considered in the light of the following description, when taken in connection with the accompanying drawings, in which like reference numerals refer to like parts, and in which:

FIG. 12 is a block diagram of a general form of time modulated antenna arrangement which may be used in accordance with the invention.

Figure 1:
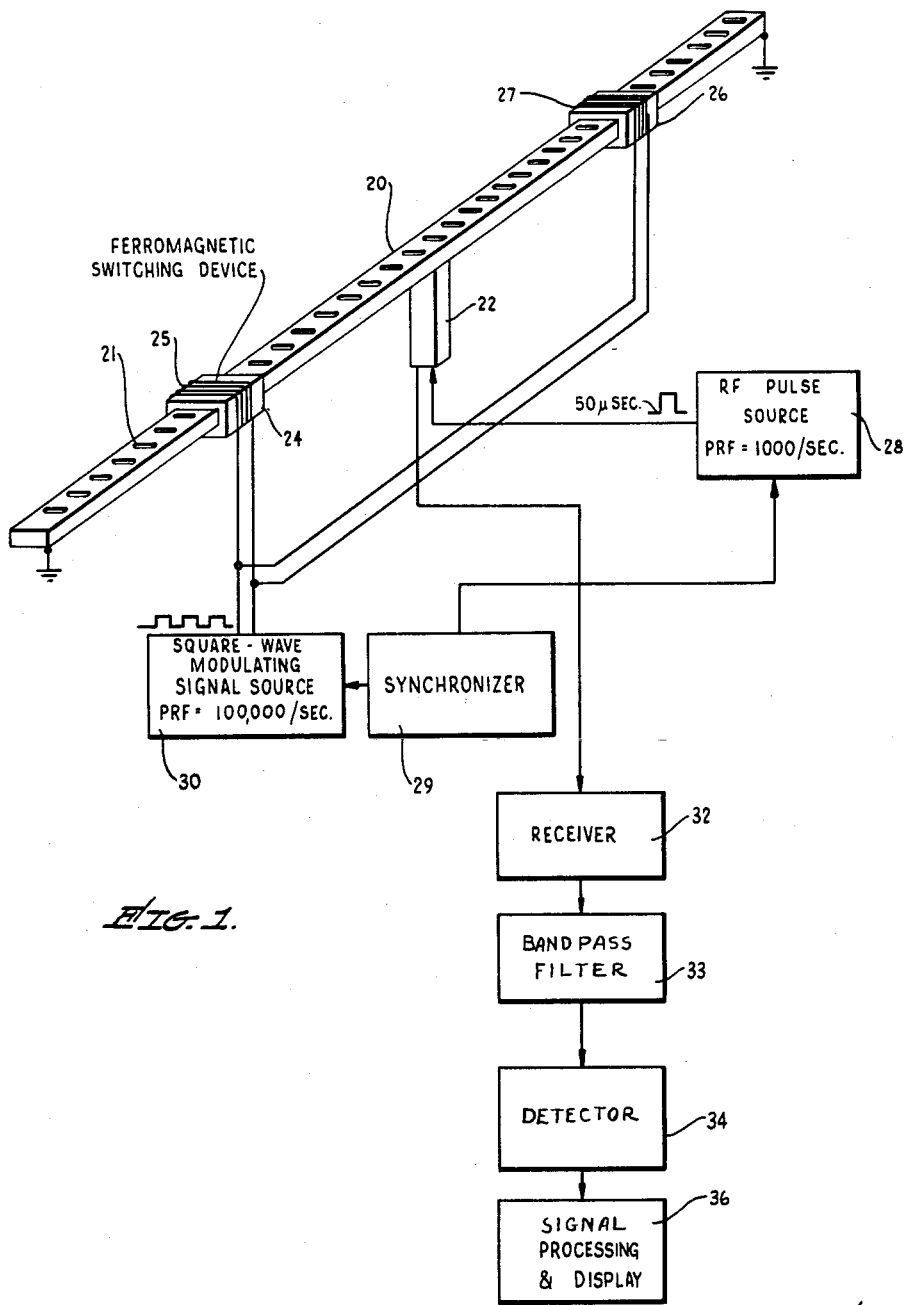
FIG. 1 is a combined schematic and block diagram of a receiving system for suppressing side lobes in accordance with the invention.

A conventional antenna may be considered to be a two-terminal network which may be methematically described by stationary and linear transfer functions. If a characteristic of the transducer is varied with time, however, the equivalent network may no longer be described by stationary functions and the transducer may in fact be nonlinear. The nature of the output signal provided by the transducer is thus a function of the nonstationary nature of the transducer as well as the nature of the input signal.

Assume that a variation of the transducer characteristics or antenna parameters with time is employed which can be expressed as a Fourier series. Accordingly, when energy is incident on an antenna whose parameters are modulated in a periodic manner, the voltage $E(\theta, t)$ across the output terminals may be expressed in the following form $$E(\theta,t) = Ag(t)\{b_0(\theta) + b_1(\theta) \cos \omega_A t + b_2(\theta) \cos 2\omega_A t + \ldots\} e^{i\omega t} \quad (1)$$

where $A$ denotes the radial dependence for the particular antenna. $\theta$ denotes the directional variation in the signal, $\omega_A$ is the angular velocity corresponding to the fundamental antenna modulation frequency, and the Fourier series having terms containing $b_n(\theta)$, the individual directional factors, represents the radiation pattern or directional characteristic.

As an illustration, if a parameter of an antenna is modulated at a frequency of 10 kilocycles per second while the antenna is receiving a continuous wave having a frequency of 1000 kilocycles per second, the modulation produces signal components at the frequency of the continuous wave and every ten kilocycles on each side thereof. That is, signal components are present at 1000, 1010, 1020, 1030 . . . kilocycles per second, and at 990, 980, 970 . . . kilocycles per second. Each of these signal components has a different directional response characteristic or antenna pattern associated with it.

The $g(t)$ term in Equation 1 represents the information content or modulation of input signal which is incident on the antenna, the nature of which depends upon the system application. For radar, $g(t)$ may be pulses of radio frequency energy and convey range information. In a communications system, $g(t)$ might represent an amplitude modulated carrier wave. Note that Equation 1 remains the same, and defines the harmonic character of the directional pattern components no matter what the nature of the input signal is.

The next important fact which may be noted about Equation 1 is that there are different directional factors $b_n(\theta)$ associated with the harmonically related frequency components $n\omega_A$. Each of the orthogonally independent terms of the Fourier series may therefore be considered to represent an independent modulation signal component corresponding to different directional response characteristics. Clearly then, if an antenna is properly modulated, there is provided a multitude of directional response patterns, each one associated with a signal component having a characteristic frequency. By proper processing of the complex signal, the signal components corresponding to individual directional response patterns may be separated and each one utilized in a conventional manner.

There are at least two significant consequences to be derived from the modulatin of antenna parameters. First, it is clear that the number of directional characteristics of a single antenna can be greatly increased. Second, individual pattern characteristics which are superior for particular applications can be selected to improve the system operation.

*Achieving desired spatial patterns.*—There is an interrelationship between a given signal component term in Equation 1 and the corresponding term in an equation describing the antenna parameter modulation. This interrelationship is in the nature of a 1:1 dependence, so that a general method of synthesis for modulated antennas is possible. Some mathematical analysis will make this clear. The radiation pattern $g(\theta)$ for a distribution of radiating sources spread over a surface $S_o$ is as follows $$g(\theta) = \int_{S_o} \psi(S_o) G(\theta|S_o) dS_o \quad (2)$$

where $\psi(S_o)$ is the complex distribution of energy over the surface, $G(\theta|S_o)$ is the Green's function characteristic to the surface $S_o$ and $\theta$ is the space variable. In Equation 2 and in subsequent mathematical expressions, the multiplicative carrier frequency factor $e^{i\omega t}$ has been omitted for convenience. We desire that $\psi(S_o)$ vary with time, as $\psi(S_o,t)$. We specifically desire that the form of this variation realize a prescribed set of $b_n(\theta)$'s in the radiation pattern $g(\theta,t)$.

Under these conditions, the radiation pattern Equation 2 may be rewritten with the time variation pattern included to form an equation for a radiation pattern varying with time $$g(\theta,t) = \int_{S_o} \psi(S_o,t) G(\theta|S_o) dS_o \quad (3)$$

Now, in accordance with the showing above, we let the variation in the distribution of energy be periodic, with fundamental angular frequency $\omega_A$. Thus, the distribution factor may be expanded into an equation representing the distribution of energy on the surface varying with time $$\psi(S_o,t) = \phi_0(S_o) + \phi_1(S_o) \cos \omega_A t + \phi_2(S_o) \cos 2\omega_A t + \ldots \quad (4)$$

Substituting the expanded equation for the distribution into the Equation 3 for the radiation pattern varying with time results in $$g(\theta,t) = \sum_{n=0}^{\infty} \left\{ \int_{S_o} \phi_n(S_o) G(\theta|S_o) dS_o \right\} \cos n\omega_A t \quad (5)$$

This expression may be compared term by term with the time modulated pattern of Equation 1, to provide the relationship of the directional factors to the harmonic coefficients in the distribution $$b_n(\theta) = \int_{S_o} \phi_n(S_o) G(\theta|S_o) dS_o \quad (6)$$

In other words each harmonic coefficient $\phi_n(S_o)$ in the expression defining the energy distribution gives rise to the corresponding coefficient or directional factor $b_n(\theta)$ in the expression defining the directional pattern. Thus, when given a number of desired directional factors $b_n(\theta)$'s, the energy distribution $\psi(S_o,t)$ can be obtained by finding the harmonic coefficients $\phi_n(S_o)$, from Equation 6 and from the expanded series of Equation 4.

Thus, it may be seen that whether a single specific directional characteristic is desired, or whether a plurality of different directional characteristics are to be used concurrently, the antenna may be synthesized in accordance with this technique.

A number of systems may be constructed in accordance with the invention by application of the analysis and the principles just described. The examples given below are merely illustrative, and in some instances they have been presented in simplified form in order to achieve greater clarity.

Side lobe suppression

The advantages of modulation of an antenna may readily be realized by the application of the principle to the diminution of side lobes. The example shown in FIG. 1, to which reference may now be made, is an illustration of the achievement of lowered side lobe levels in a radar system. With such a system, the principal echo signal becomes more sharply defined and there is less danger of error due to the detection of erroneous signals of larger magnitude which are outside the principal beam but within the side lobe angle.

Illustrated in FIG. 1 is a waveguide array 20 of rectangular cross section having a number of radiation slots 21 along one of the broad walls therein. The waveguide array 20 includes an input terminal 22 coupled to the array 20 and feeding energy to it at a central point. The waveguide array 20 has a first principal effective length, defined by the over-all length of the array 20.

This principal effective length may be shortened to a second or alternate effective length by a pair of switching devices 24, 26 each positioned between the input terminal 22 and a different end of the array 20. As indicated, the switching devices 24 and 26 may be ferromagnetic devices, each of which is energized by an associated coil 25 or 27.

Signals to be transmitted are provided to the input terminal 22 of the waveguide array 20 from a radio frequency (RF) pulse source 28 which has a pulse repetition frequency (PRF) in the present example of 1,000 pulses per second. The pulses may be generated by the pulse source 28 in response to the signals from a radar synchronizer 29. Alternatively, if desired, the target may be illuminated by pulses from a radar transmitter separate from the radar receiving system of the present invention. The synchronizer 29 may be a part of a radar system, the remainder of which has been omitted for simplicity.

The synchronizer 29 is also used to provide timing control signals to a square wave modulating signal source 30 which is coupled to each of the ferromagnetic devices 24 and 26. Under control of the synchronizer 29 and the remainder of the system, these signals are provided during the time that echo signals are being returned to the waveguide array 20. The PRF (pulse repetition frequency) of the modulating signal source 30 is sufficiently high with respect to the duration of the received pulses to insure that at least a full cycle of antenna modulation occurs during reception of each of the RF pulses. In the present example, the duration of the received pulse is 50 microseconds, and the PRF of the modulating signal is 100,000 pulses per second so that five modulating pulses are provided during each main transmitted pulse. Hence, the antenna modulation frequency is 0.1 megacycle per second.

The received signal is a pulsed radio frequency wave having a frequency of 10,000 megacycles per second. Consequently, the modulation of the antenna at a frequency of 0.1 megacycle per second produces modulation signal components at the frequency of the pulsed radio frequency wave and every 0.1 megacycle on each side thereof. That is, signal components are present at 10,000.0, 10,000.1, 10,000.2, 10,000.3 . . . megacycles per per second, and at 9,999.9, 9,999.8, 9,999.7 . . . megacycles per second.

The signal from the modulated antenna array 20 is applied from the central terminal 22 to a signal receiver 32. Transmit-receive switching means (not shown) may be employed if desired to direct the received echo signals to the receiver and to protect the receiver from the high energy RF pulses from the pulse source 28.

The consequence of the modulation of the antenna length parameter during reception is a modulation of the antenna pattern during the received pulse. The full length of the waveguide array 20 has a somewhat narrower pencil beam than does the alternate length between the switching devices 24 and 26. The use of the arrangement provided here, however, establishes a synthetic pattern which is actually more sharply defined, in terms of side lobe level, than the pattern of either the full length antenna or the alternate length antenna when each is taken alone. The received signals are provided to the receiver portion 32 of the radar system (not shown) for amplification and use, and, as indicated above, is composed of a plurality of signal components due to the modulation of the parameters of the waveguide array 20. The time average signal component represented by the $b_0(\theta)$ term or D.C. term in Equation 1 is selected by passing the received signal through a filter 33 which is insensitive to the other components of the received signal. In the present example, this signal component is the one having a frequency of 10,000.0 megacycles per second. For convenience in filtering, the signal may first be heterodyned to a lower intermediate frequency. The bandwidth of the filter 33 is sufficiently narrow to pass only the desired signal component. The selected signal component is improved as to side lobe response, as will be shown below. This signal is coupled from the filter 33 to a detector 34 and then to conventional signal processing and display units 36 for use as may be desired.

For example, the signal processing circuits may be video amplifiers and the display unit may be a cathode ray tube. Thus, in applying the present invention to a conventional radar set, the only modifications are in the modulation of the antenna and the use of a filter to select the desired modulation component. The remainder of the radar system remains conventional.

It would not ordinarily be considered that modulation of antenna parameters could improve the directive response of a receiving system. The analysis given above, however, shows that when the modulation is in a form which can be expressed as a Fourier series, then directional coefficients of selected nature are associated with the signal components. The square wave modulation employed in the example of FIG. 1 can, of course, be expressed as a Fourier series. When the time average component is selected, this is found to have the desired improved characteristics.

The principle of operation here provided may be thought of as generation of a synthetic pattern through the use of the harmonic terms and through the use of the 1:1 correlation between selected directional coefficient in the harmonic terms. A real antenna pattern having the improved directional characteristics is not in fact present, because the antenna is merely switched, in this example, between two states neither of which has this superior performance. The fact that the signal component corresponding to the time average term representing the desired directional characteristic can be extracted means, however, that the improved pattern is made available. Consequently, limitations hitherto thought inherent in given antenna arrays may be surmounted. As one result, the extreme mechanical tolerances necessary to realize low side lobes in a nonmodulated antenna may be relaxed by virtue of the additional degree of freedom provided by the antenna modulation.

The results achieved by the arrangement of FIG. 1 can also be understood on consideration of the analysis used above for the general case. We may consider that the array 20 of FIG. 1 having a length $2l_0$ has a pattern $g(\theta)$ which may be expressed as follows $$g(\theta) = A \frac{\sin (kl_0 \sin \theta)}{\sin \theta} \qquad (7)$$

$\theta$ being the angular deviation from a line normal to the array. The side lobe level of this pattern is 13.2 db. If it is assumed that the half array length is modulated in time as $$l = l_o[1 + \beta f(t)] \quad (8)$$

where $f(t)$ is the modulation and $\beta$ is a length parameter, the time varying pattern is expressed as $$g(\theta, t) = A \frac{\sin\{kl_o[1 + \beta f(t)] \sin(\theta)\}}{\sin \theta} \quad (9)$$

Here we are concerned only with the time average pattern $b_o(\theta)$, the time average for which is obtained by the common integral expression $$\langle g(\theta, t) \rangle = b_o(\theta) = \frac{1}{T}\int_o^T g(\theta, t) dt \quad (10)$$

where T is the modulation period. When this expression is used with the immediately previous expression (Equation 9) and the integral evaluated with $f(t)$ a square wave and expressed as follows $$f(t) = \begin{cases} 1 & 0 \leq t \leq \frac{T}{2} \\ -1 & \frac{T}{2} \leq t \leq T \end{cases}$$

the resulting time average pattern may be expressed as $$b_o(\theta) = A \frac{\sin\{kl_o \sin \theta\}}{\sin \theta} \cos(kl_o \beta \sin \theta) \quad (11)$$

Comparison of this term with Equation 7 above shows that it is the same except for the multiplicative factor $\cos(kl_o \beta \sin \theta)$. This multiplicative factor has the effect of providing an additional pattern taper resulting in lowered side lobes.

Figure 2:
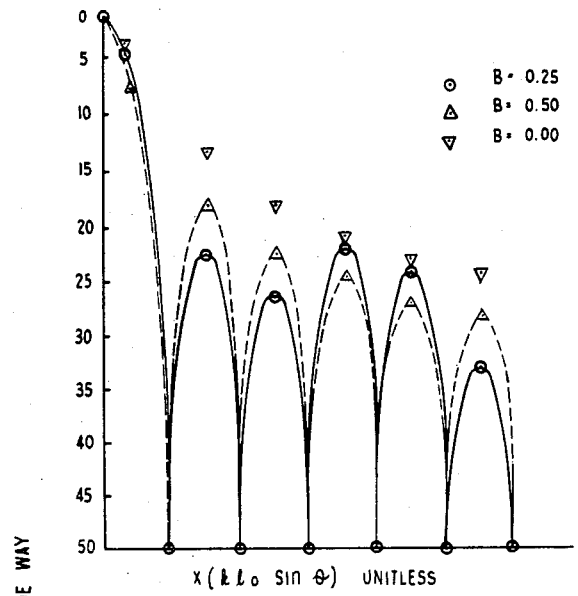
FIG. 2 is a graph of beam power vs. angular position of the receiving system of FIG. 1.

The parameter $\beta$ is the controlling device in setting the side lobe level. FIG. 2 displays a power plot of Equation 11, the time average pattern for square wave switching, for judicious choices of this parameter. The optimum condition is seen to correspond to a $\beta$ value of 0.25, giving a side lobe level of approximately 23 db less than the principal lobe level. $\beta$ is the ratio of reduction in length.

A practical embodiment of the arrangement of FIG. 1 has operated in this manner, confirming the calculated values above. A normal side lobe level of 13.2 db, for the unmodulated array, has been reduced to 23 db with a $\beta$ value of approximately 0.25. This is an order of magnitude reduction in the side lobe level, and has been achieved by using only two alternate patterns and very simple square wave switching.

Other simple forms of modulation may also be employed, with modulated antennas, to provide a similar reduction in side lobe level. A linear array might be operated through a rotating disk consisting of pin wheel shaped sections extending from the center and which are alternately opaque and transparent to radiant energy. A suitable disk is shown in U.S. Patent No. 2,757,341, issued July 31, 1956. Such a disk when rotated when its center concentric with the center of the array, causes a sinousidal modulation of the antenna parameters at a frequency determined by the number of sections and the speed of rotation. When the substitution of Equation 9 above is made into Equation 10 and the time average pattern derived with the integral a sinusoid, the functional expression being $$f(t) = \cos \frac{2\pi t}{T}$$

the result is $$b_o(\theta) = \frac{A \sin\{kl_o \sin \theta\}}{\sin \theta} J_o(kl_o \beta \sin \theta) \quad (12)$$

The presence of the multiplicative term $J_o(Kl_o \beta \sin \theta)$ again provides the effect of a taper in the pattern. The $J_o$ term represents the Bessel function of zero order.

A variation of the aperture distribution of an antenna with time may also be used, in accordance with the techniques here described, to provide reduction of the side lobe level. A uniform array of fixed length may be employed, with a time varying linear phase distribution. Such variations can be provided, as a simple example, by employing individual ganged phase shifters in the feed lines of an array consisting of a number of individual raidators. As will be seen hereafter, the arrangement illustrated in FIG. 12, for example, employs a plurality of phase-shifting elements to control individual radiating elements as described above, and may be operated with a time varying linear phase distribution.

The stationary pattern $g(\theta)$ for an array with a linear phase distribution is $$g(\theta) = \frac{2}{k} \frac{\sin[kl_o(\sin \theta - \sin \theta_o)]}{\sin \theta - \sin \theta_o} \quad (13)$$

where $\theta_o$ is the scan angle resulting from the linear phase distribution. Then the phase distribution may be caused to vary with time such that $$\sin \theta_o = f\left(\frac{t}{T}\right) \sin \theta_{max}. \quad (14)$$

This variation is an oscillation of the beam position back and forth on either side of broadside an amount $\theta_{max}$. If $f(t/T)$ is again taken as a square wave, and the time average of Equation 13 taken using the variation expressed by Equation 14, the result is $$b_o(\theta) = \frac{2}{k}\left\{\frac{\sin \theta \sin(kl_o \sin \theta) \cos(kl_o \sin \theta_{max}.}{\sin^2 \theta - \sin^2 \theta_{max}.} \right. $$
$$\left. - \frac{\sin \theta_{max}. \cos(kl_o \sin \theta) \sin(kl_o \sin \theta_{max}.)}{\sin^2 \theta - \sin^2 \theta_{max}.}\right\} \quad (15)$$

This Equation 15 simplifies considerably for particular values of $\theta_{max}$. As an example, if $$kl_o \sin \theta_{max}. = \frac{\pi}{2}$$

then $$B_o(\theta) = \frac{\pi}{k^2 l_o}\left\{\frac{\cos(kl_o \sin \theta)}{\sin^2 \theta - \left(\frac{\pi}{2kl_o}\right)^2}\right\} \quad (16)$$

Figure 3:
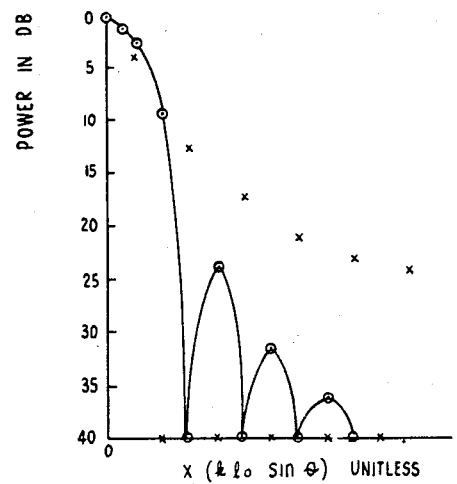
FIG. 3 is a graph of beam power vs. angular position of a suppressed side lobe system using time-varying aperture distribution.

A power plot of Equation 16 is given in FIG. 3, which illustrates the reduction in side lobe level below that usually provided.

The preceding examples and analysis serve to establish the side lobe suppression capabilities of techniques using antenna modulation. The examples given, however, provide approximately 10 db improvement, whereas it may be desired to have more or different degrees of improvement. It is desirable to obtain a synthesis procedure by which a given side lobe level can be realized. Considering again a linear array with a uniform distribution, the integral form of the time average pattern can be expressed as $$\langle g(\theta,t) \rangle = \frac{1}{T}\int_o^T \int_{-l(t)}^{l(t)} e^{jkx \sin \theta} dx dt \quad (17)$$

We wish to determine the length variation $l(t)$ so as to realize a desired pattern form, $g(\theta,t)$ with given side lobe levels.

Such procedure has been worked out for the linear array, and applied to obtaining a pattern with controllable side lobes. A simple pattern of this type, given by T. T. Taylor, is $$g(u) = \frac{\sin(\pi\sqrt{u^2 - B^2})}{(\pi\sqrt{u^2 - B^2})} \quad (18)$$

where $u$ is the normalized space variable and B is the side lobe controlling factor; the first side lobe voltage ratio being given by $$\frac{4.6 \sin h\pi B}{\pi B} \quad (19)$$

Figure 4:
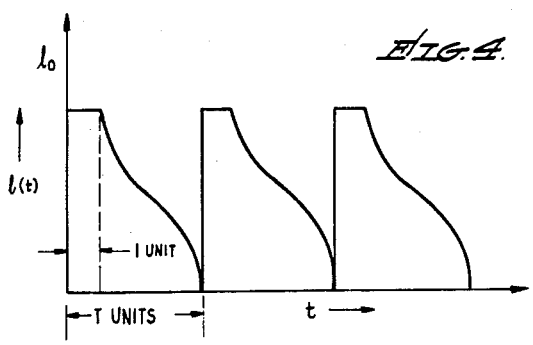
FIG. 4 is a graph of length variation, plotted on a universal time scale, for use in establishment of controllable side lobes for a linear array.

Using the synthesis procedure developed above, it has been determined that the length variation $l(t)$ needed to realize this particular pattern form follows the variation of FIG. 4. FIG. 4 shows the general form of this variation plotted on a universal time scale. The parameter which controls the side lobe level in this case (in analogy with B of (16)) is the ratio of the period T to the pedestal height denoted by unit in FIG. 4.

It is evident that these techniques for the reduction of side lobes can be very usefully employed in certain applications which require extremely directive antenna response. Radio astronomy systems, for example, are intended to detect signals from a given source of energy, specifically from a distant radio star. The star constitutes a source of radiation of extremely narrow dimensions. In detecting the signal from this source, it is highly desirable to be able to exclude signals from other sources in space which are near it. The establishment of a narrow beam with low side lobes appreciably facilitates this detection process. Similarly, infrared radiation may be distinguished better, in the same manner. It is evident from the above discussion that an existing antenna configuration could utilize modulation of signals in the manner described to effectively overcome limitations which are inherent in the receiving system.

*Simultaneous pattern operation with a single antenna*

The use of the time modulation of antenna parameters in the manner indicated above provides a means of achieving simultaneous pattern operation with a single antenna.

*Dual beam conical lobing system.*—A relatively simple illustration of how simultaneous dual pattern operation may be achieved with an existing antenna is provided by a conventional conical lobing antenna system. Here reference may be made to FIG. 5, which shows in general fashion a conical scanning system arranged to utilize antenna modulation techniques. The system illustrated has been simplified for clarity, it being understood that the antenna or system components which might be employed may be selected as desired by those skilled in the art to which conical lobing pertains.

In this example, it is seen that the antenna employed is of the reflector dish type, and that the parameter which is varied is a feed parameter, specifically the manner in which the pattern is nutated. The differences between this type of radiant energy transducer and the structure of FIG. 1 help to make apparent the extent of the applicability of the antenna modulation technique here provided.

Figures 5, 6:
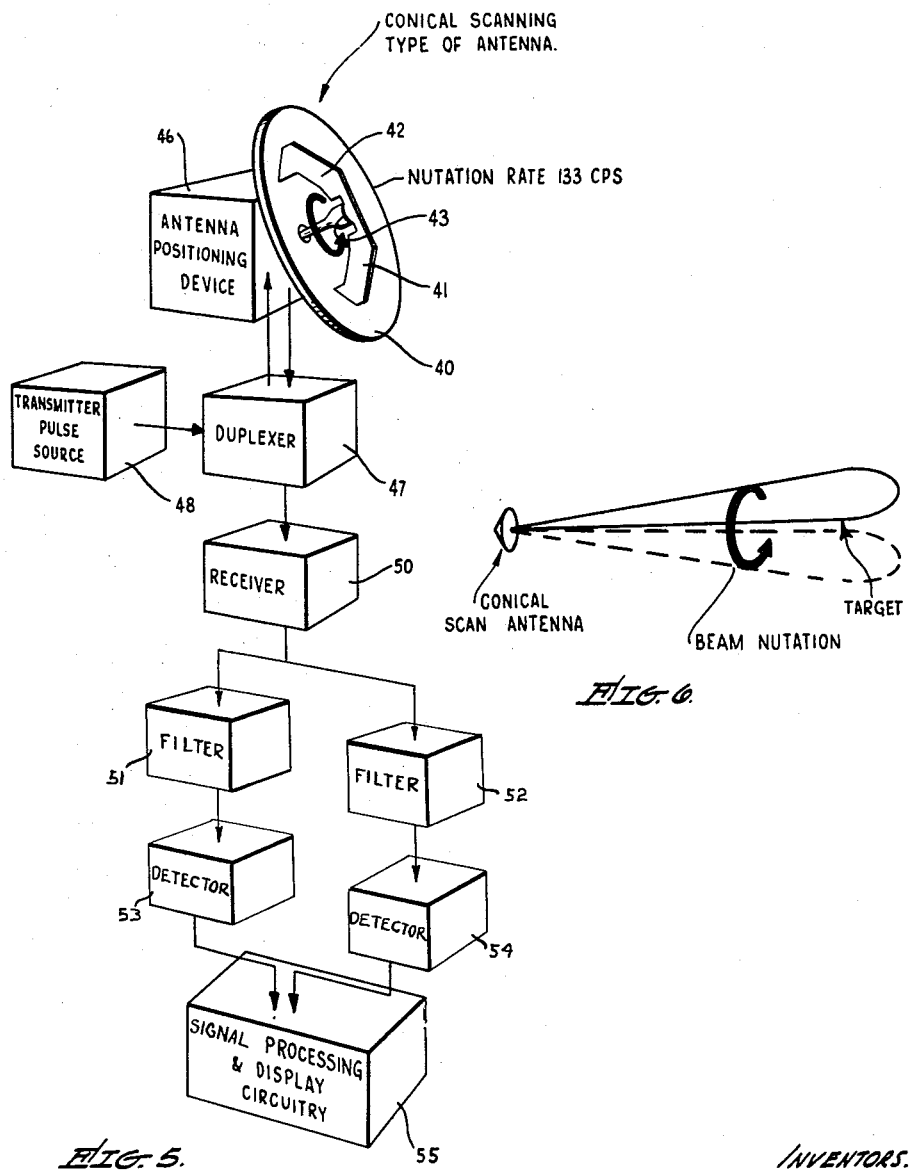
FIG. 5 is a combined schematic and block diagram of an arrangement for providing dual beam conical lobing using a cyclical modulation in accordance with the invention.
FIG. 6 is a generalized illustration of the manner in which a conical scanning antenna operates in scanning a target.

The conical scanning antenna consists of a reflector dish 40, a pair of waveguide feed arms 41 and 42, and a centrally disposed rotating lens assembly 43. The conical scan operation, which consists of nutation of the beam around the target, in the manner of FIG. 6 is achieved by rotation of the lens 43, which may include an asymmetrical lens structure arranged to provide a slight deflection of the beam pattern from the central axis of the reflector dish 40. As the lens 43 is rotated, therefore, the beam nutation is provided. An antenna positioning device 46 is employed, in conjunction with the remainder of the system, and is responsive to the signals to maintain the beam centered about the target.

The system may also employ a duplexer arrangement 47 for selectively coupling the transmitter pulse source 48 and the associated receiver 50 to the antenna feed arms 41 and 42. The use of the duplexer insures that high power pulses from the transmitter source 48 are isolated from the receiver 50, and provides a low loss path for signals being applied to the receiver 50.

In this example, the nutation rate is 133 cycles per second. As discussed above, this nutation is actually a modulation of the parameters of the antenna. With the realization that this modulation can be used in other respects, analysis will show that the signal from the receiver 50 has more than one useful component. The antenna modulation or nutation produces modulation signal components at the frequency of the pulsed radio frequency wave and every 133 cycles per second on each side thereof. The signal component displaced from the center frequency by 133 cycles per second corresponds to the second or fundamental frequency term of a Fourier series, while the signal component at the center frequency corresponds to the first or time average term of the Fourier series. The time average signal component has a directional response characteristic corresponding to an on-axis beam pattern. The fundamental frequency signal component corresponding to the second term of the Fourier series has a directional response characteristic corresponding to a pair of lobes, one on each side of the central axis. Consequently, the directional response characteristics of the two signal components are entirely different types of antenna patterns. Bandpass filters 51 and 52 extract these two signal components introduced by the modulation or nutation of the antenna and apply them through detectors 53, 54 to conventional signal processing and display circuitry 55. The signal processing and display circuitry may be a pair of video amplifiers and a cathode ray tube arranged for simultaneous display of both signal components or, alternatively, may have two cathode ray tubes so that each signal component may be displayed separately. Consequently, the antenna has effectively been operated with two different directive response patterns.

Figure 8:
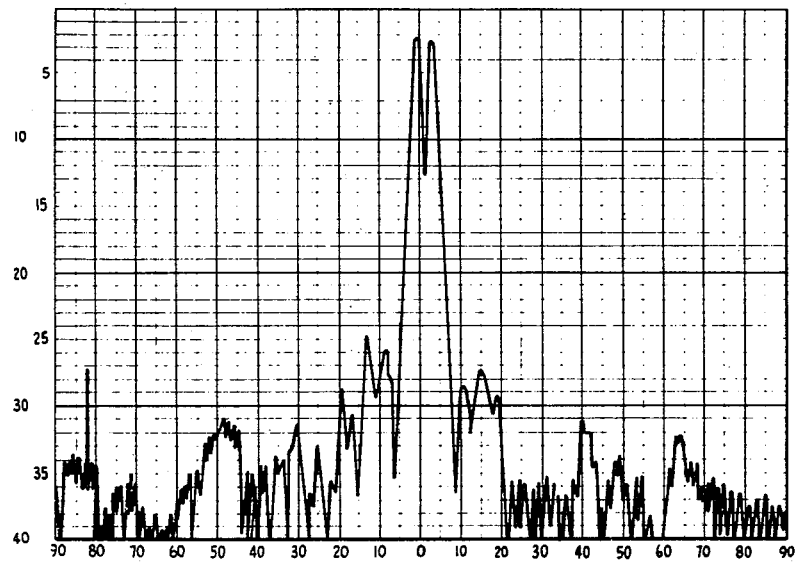
FIG. 8 is a graph of beam power vs. angular position of the modulation component corresponding to the fundamental frequency of a Fourier series of the dual beam conical lobing system of FIG. 5.
Figure 7:
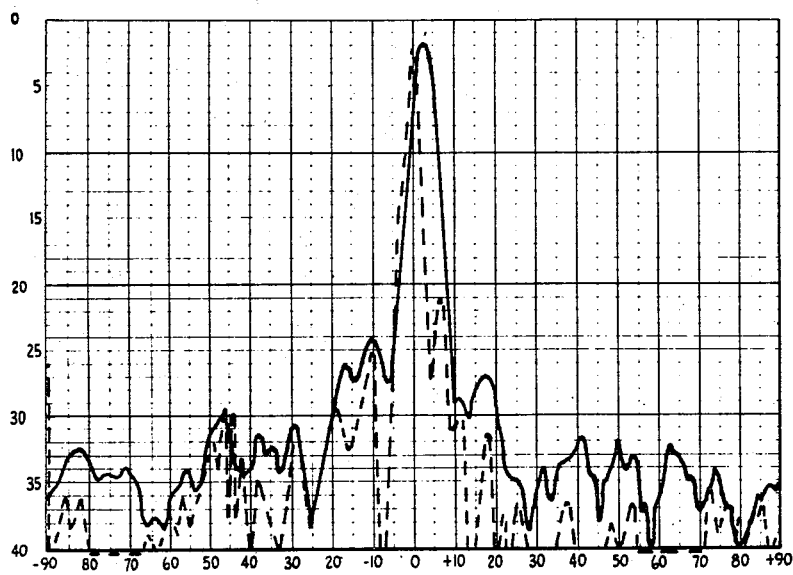
FIG. 7 is a graph of beam power vs. angular position for the stationary reference pattern and the pattern of the modulation component corresponding to the D.C. term of the Fourier series of the dual beam conical lobing system of FIG. 5.

FIGS. 7 and 8 illustrate the effective antenna patterns provided concurrently by the arrangement of FIG. 5. FIG. 7, to which reference may now be made, shows in dotted lines a plot of beam power for angular position of the stationary reference pattern of the dish antenna. FIG. 7 shows as a solid line a similar plot of the directional response of the time average component as the antenna is rotated. This corresponds to the first term $b_0(\theta)$ of the Fourier series. In FIG. 8 is shown the directional response of the signal component which corresponds to the second or fundamental frequency term $b_1(\theta)$ of the Fourier series.

*Simultaneous dual pattern operation.*—Through the use of a single antenna which is modulated in proper fashion, two or more widely different directive response pattern modes can be established. For example, it may be desirable in a ground based radar system to provide capacity for searching a wide area, along with accurate detection and tracking capabilities. An antenna which can provide both a narrow pencil beam and a fan type or $\csc^2 \theta$ pattern would have such dual capabilities. These dual capabilities can be readily realized through the use of antenna modulation techniques by modulating the antenna in such a way as to provide the desired directivity factors associated with two signal components. That is, one directivity factor would have the pencil beam characteristic, while the other would have the $\csc^2 \theta$ characteristic. By proper processing of the complex signal these pattern characteristics, which exist simultaneously, may be utilized concurrently. That is, the antenna modulation with subsequent filtering effectively converts a single radar to perform like two radars, each having a different directivity characteristic. The two signals supplied by the filters are processed in separate video amplifiers and may be displayed simultaneously on one cathode ray tube, or may be displayed separately on different cathode ray tubes.

A simple example of this concept is a linear array of length $2l_0$, from which a pencil beam and a $\csc^2 \theta$ pattern are desired. In accordance with the equations given above, and considering the time varying pattern, let $$b_0 \theta = \frac{A_0 \sin (kl_0 \sin \theta)}{\sin \theta} \quad (20)$$

and $$b_1(\theta) = A_1 \csc^2 \theta \quad (21)$$

the complete time varying pattern is then $$g(\theta,t) = \frac{A_o \sin(kl_o \sin\theta)}{\sin\theta} + A_1 \csc^2\theta \cos\omega_A t \quad (22)$$

and the antenna modulation necessary to realize this composite antenna directivity characteristic can be found by the procedures given above. The two patterns are to be realized from a single array, therefore in the synthesis, the problem cannot be treated as a separable one. It is convenient, however, to consider the array as broken down into two component elements, each comprising a linear array. One of the arrays may be unmodulated and have the distribution necessary to give the term corresponding to a pencil beam. The input to the second array can be modulated as $\cos\omega_A t$ with a distribution to achieve the $\csc^2\theta$ characteristic. The pattern resulting from the combination is exactly that given by the complete time varying pattern equation. If these two arrays are superimposed, by proper synthesis, an equivalent single array with the desired characteristics is the result. That is, the aperture distribution for the two theoretical arrays is found by the mathematical method described hereinbefore, and then the two aperture distributions are mathematically combined to yield the single aperture distribution necessary to provide both the pencil beam and the $\csc^2\theta$ pattern. Then an antenna is constructed and modulated to provide the required aperture distribution. As will be more fully understood hereafter, the arrangement of FIG. 12 will provide any desired aperture distribution.

*Simultaneous scanning of more than one region.*—Many applications of detection and identification systems involve the detection and location of targets over a wide angular region. The techniques heretofore used have generally employed complicated arrangements for physically moving the equipment to shift the direction of scan. The advantages of having a fixed or stationary antenna which accomplishes the same results are apparent, both as to simplicity of construction and as to other desirable features.

In such an arrangement the directivity factors $b_n(\theta)$ should represent pencil beams, each pointed in a slightly different direction. Again considering a linear array of length $2l_o$, let $$b_n(\theta) = A_n \frac{\sin\{kl_o[\sin\theta - \sin\theta_n]\}}{[\sin\theta - \sin\theta_n]} \quad (23)$$

With this relationship, the pointing direction for each directivity factor is different and defined by the respective $\theta_n$.

The time varying pattern under this condition is $$g(\theta,t) = \sum_{m=0}^{N} \frac{\sin\{kl_o[\sin\theta - \sin\theta_n]\}}{[\sin\theta - \sin\theta_n]} \cos n\omega_A t \quad (24)$$

where the $A_n$ are adjusted to make the return from the peak of each space pattern equal. The number $N$ and the values $\theta_n$ may be chosen consistent with the maximum coverage desired and the necessary discrete angular accuracy. It should be understood that the concept remains the same regardless of the number of patterns or their spatial separation.

Figure 9:
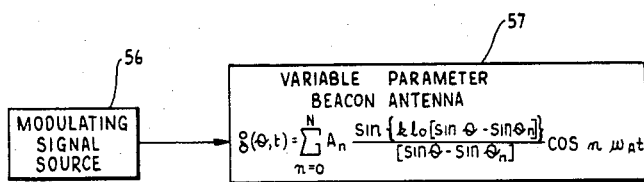
FIG. 9 is a block diagram of an omnidirectional antenna system having directive properties through the modulation of antenna parameters in accordance with the present invention.

A system by which simultaneous pattern operation in different directions can be provided is illustrated in general form in FIG. 9. Referring now to that figure, a variable parameter beacon antenna 57 is operated under control of a modulating signal source 56 to provide the desired time-varying pattern $g(\theta,t)$ of Equation 24. The beacon antenna 57 may have varying feed, length, distribution or other parameters in accordance with the considerations given above. Here it is assumed, for purposes of simplicity, that the received signal is provided by a separate transmitter and antenna (not shown). The variable parameter beacon antenna 57 may thus be modulated continuously in cyclic fashion. Signals intercepted or received by the beacon antenna 57 are provided to a receiver 58, the output of which contains all the modulation signal components corresponding to the terms of the Fourier expansion introduced by the modulation of the parameters of the antenna 57, as well as the input signal information $g(t)$.

Thus, the coupling of the receiver 58 to a group of band pass filters 60 makes possible the separation of the different signal components. The individual band pass filters 60 are tuned to pass the various separate harmonic signal components and are followed by individual detectors 61. In this example the directivity factors associated with each angular position $\theta_1, \theta_2 \ldots \theta_n$ are substantially alike, that is, the response patterns are of the same shape but the angular positions differ. This is in contrast to the examples previously given, in which different patterns of like direction were used. Thus, the signals provided from the separate filters 60 can be used to provide separate two or three-dimensional target indications at associated signal processing and display circuitry 62. That is, in a radar beacon such as might be used at an airport, for example, the different signal components corresponding to different angular directions are applied through video amplifiers to one or more cathode ray tubes which indicate the location of any aircraft in the vicinity.

*Modification of directivity of a communications system*

Figure 10:
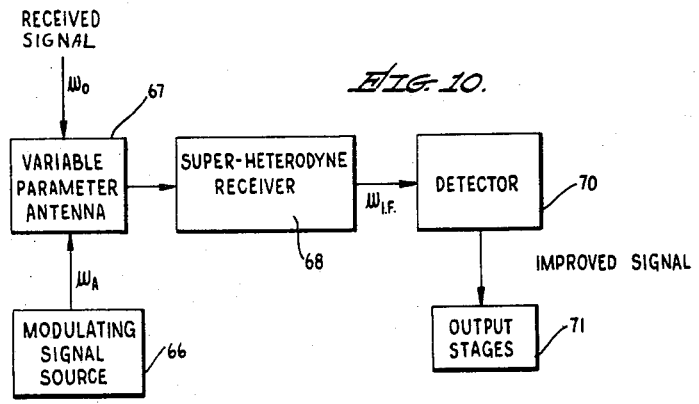
FIG. 10 is a block diagram of a communications system utilizing side lobe suppression in accordance with this invention to achieve improved performance.

Antenna modulation may be employed with a communications system, such as is illustrated in block diagram form in FIG. 10. The communications system may include a variable parameter antenna 67, receiving communication signals $g(t)$ such as an amplitude modulated carrier wave conveying speech from a distant transmitter (not shown) operating at a carrier frequency corresponding to an angular frequency of $\omega_0$. The antenna 67 parameter or parameters may be varied with a modulating signal having a modulation frequency corresponding to angular frequency $\omega_A$. The purpose for employing the invention in this application is to provide additional side lobe suppression. Signals from the antenna 67 are applied to a superheterodyne receiver 68, which converts the signal to an intermediate frequency corresponding to $\omega_{IF}$. The intermediate frequency $\omega_{IF}$ is applied to a detector 70, and the output of the detector 70 is provided to the output stages 71, such as the speaker or recorder, of the system.

The voltage incident on the detector 70 at the intermediate frequency is given by $$E(\theta,t) = Ag(t)\{b_0\theta + b_1(\theta)\cos\omega_A t + b_2(\theta)\cos 2\omega_A t + \ldots\}\cos\omega_{IF} t \quad (25)$$

Out of this complex signal only the side lobe suppressed signal component, along with the voice signal $g(t)$, is desired. This may be expressed as $$Ag(t)b_0(\theta)\cos\omega_{IF} t \quad (26)$$

To extract these desired terms, while rejecting all the remaining terms of (25), which would constitute error terms, we need only design the bandwidth of the receiver 68 properly. It is assumed, in this example, that the voice signals fall within a spectrum ranging from 100 c.p.s. to 3,000 c.p.s., values which are often used. The receiver 68 has a 6,000 cycle bandwidth. Under this condition the frequency corresponding to the upper limit of the voice spectrum, in the superheterodyne receiver 68, is $\omega_{IF} \pm 3{,}000$ c.p.s., for dual sideband operation. The lower limit of the error frequencies is $(\omega_{IF} \pm \omega_A) \mp 3{,}000$ c.p.s. For proper rejection of the error terms, we desire the lowest error frequency, at IF, to be higher than the highest voice frequency at IF. Mathematically this may be expressed as $$\omega_{IF} \pm \omega_A \mp 3000 \text{ c.p.s.} \geq \omega_{IF} \pm 3000 \text{ c.p.s.} \quad (29)$$

which reduces to $$|\omega_A| \geq 6000 \text{ c.p.s.} \quad (30)$$

Stated in words, the lowest antenna modulation frequency which can be used with a 6,000 c.p.s. double sideband signal is a 6,000 c.p.s. modulation, if error terms are not to be introduced. But if this relationship is observed by, as here, using a receiver of this bandwidth, the desired signal component can be selected without modification of the receiver. The same modulation rate would also be employed with a 3,000 c.p.s. single sideband system.

Figure 11:
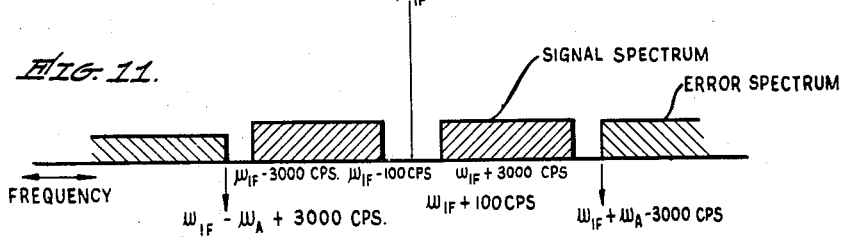
FIG. 11 is a graph of amplitude vs. frequency illustrating frequency spectrum distributions for the arrangement of FIG. 10.

The relationships just described are illustrated in the frequency spectrum graph of FIG. 11 for the frequency relationships in the receiver 68 of FIG. 10. The desired signal component is placed within the bandwidth of the receiver while all other signal components fall outside.

General modulated antenna system

The most general and versatile radiant energy receiving system is an array in which each antenna element is individually controlled in amplitude and phase by its own modulating element. For such an arrangement, a unified time modulation pattern can be applied which is given any desired form to achieve a single function, such as side lobe suppression, or to achieve a variety of functions, such as multipattern operation. In other words, the general example of the modulated antenna, in which the elements are thus individually variable, can operate to provide any of the individual uses of antenna modulation during the period in which a particular use is desired.

The general modulated antenna may be of the form exemplified by FIG. 12. In this figure, a number of linear arrays 74 are arranged in parallel to define a planar array 75 of radiators. Each of the linear arrays may have its own arrangement of individual radiation apertures or slots 76, with each of the radiation apertures 76 having a different associated modulating element 80. The modulating elements 80 have been illustrated, for simplicity and clarity, in fragmentary fashion. It will be understood that each slot 70 is modulated and that leads 81 extend from each of the modulators 80 to a common control.

The essential feature of such an array is that the radiation from the individual apertures 76 be capable of being controlled both in amplitude and in phase independently of the remainder of the apertures. Such an arrangement has been provided by the use of an electrically variable complex slot.

The electrically variable complex slot device is fully described in a copending application filed by H. E. Shanks, entitled "Electrically Variable Complex Slot," on June 18, 1958, Serial No. 742,804, now U.S. Patent No. 2,946,056, and assigned to the assignee of the present invention. Because this arrangement is fully described in the above-identified U.S. Patent, the nature of the arrangement will be indicated only generally here. Each of the complex slots 76 which is to provide radiation is positioned along the center line of a broad wall of a rectangular waveguide 74, which forms the principal portion of each linear array of FIG. 12. The slots 76 normally do not radiate. Two irises (shown in the referenced patent) having inductive elements of a ferrite material are disposed in spaced-apart fixed relation with respect to the slot 76. The irises may be magnetized under control of an associated electromagnet. The magnetic field through the ferrite material results in the disturbance of the current distribution within the waveguide 74 so that the slot 76 radiates. By control of the magnetization of the irises, the radiation can be varied in amplitude and from zero to 360 degrees in phase.

The linear arrays 74 of the modulated antenna 75 are each coupled through a duplexer 94 to a transmitter 95 and a receiver 96. The duplexer 94 provides the function of switching energy between the transmitter 95 and the antenna 75, and the antenna 75 and the receiver 96. Signals from the receiver 96 are passed to a plurality of band pass filters 101, 102, 103, 104, 105 arranged in parallel, and each adjusted to provide a different frequency pass band. Signals from the band pass filters 101 through 105 are applied through detectors 106 and a mode selection circuit 107 to signal processing and display circuits 108. It will be understood that the signal processing and display circuits 108 are conventional output or utilization circuits, and that their exact nature will depend on the use to which the system is to be put. In a radar system, the signal processing circuits will be video amplifiers, and the display circuits will be cathode ray tubes. In a radioteletype system, the signal processing circuits will be signal amplifiers, and the display circuit will be a teletype printer.

With the modulated antenna 75 may be employed any one of a number of systems which are available for providing the needed control of the individual modulators 80. The sub-systems used are designated here as the multiple function signal generator 110 and the program selector 112. The modulation function to be provided for each position varies both as to amplitude and phase, and must be in accordance with the modulation which is desired for the specific form or forms of modulation which are desired for the antenna parameters. This function could be provided by a modern high speed digital computing system operating cyclically to repeatedly change the setting of the individual modulators 80 to provide the desired change in antenna 75 parameters. Inasmuch as the general form of the modulation which is employed in accordance with this invention is cyclical, however, the modulation can be provided by analog devices which provide a cyclical variation for each antenna position to control both the amplitude and phase through the associated modulator 80.

A number of examples may be provided to illustrate the most complex functions which may be provided. It should be understood, however, that the multiple function signal generator 110 which is provided can operate with the relatively simple square wave or sine wave types of modulation, and that the modulation need not be substantially different for each linear array 74, so that simple switching or sine wave generating techniques might be employed. On the other hand, when it is desired to provide a more complex function for each of the modulators 80, the technique might be used of providing individual cyclical pattern storage for each position, and deriving signals when that pattern is to be generated. A variable density light pattern recorded on an endless medium, such as a rotating drum, and sensed photoelectrically for each position, could be used to provide such a complex function. A suitable arrangement is shown in U.S. Patent No. 2,264,587, issued December 2, 1941, for example. One track might be employed for each position for each Fourier series to be utilized. With the rotating drum, no problems of synchronization between the different positions arise. The usual forms of amplification and driving circuitry should be utilized with this arrangement.

Under control of the program selector 112, therefore, the multiple function signal generator 110 can provide the desired modulation with time of the antenna 75 parameters. Signals provided through the duplexer 94 to the receiver 96, therefore, may truly be regarded as being of the form of the general equation for the voltage across the input terminals $$E(\theta,t) = Ag(t)\{b_0(\theta) + b_1(\theta) \cos \omega_A t + b_2(\theta) \cos 2\omega_A t \ldots\}e^{i\omega t} \quad (31)$$

For this arrangement, the band pass filters 101 through 105 are arranged to pass the signal components corresponding to the various terms of the Fourier series $f_0, f_1, f_2, f_3, f_4$, etc., thus to provide outputs representative of the different directivity factors $b_0, b_1, b_2, b_3, b_4$, etc.

The mode selection circuit 107, which in the simplest case might be a commutator, could select one or more of the unique signal components to provide outputs to the associated signal processing and display circuits 108.

Thus, the general modulated antenna illustrated in FIG. 12 provides a comprehensive arrangement for achieveing not only one desirable result such as inertia-less scanning, but concurrently also provides the added flexibility and improvements inherent in the modulation of antennas.

*Summary*

It has been shown that modulation of antenna parameters in cyclical fashion so as to introduce a plurality of harmonic signal components establishes directional response characteristics for each signal component. Further, it has been shown that desirable directional response characteristics may be achieved by practical synthesis procedures. Hence, on extraction of the appropriate signal component, the desired directional response characteristic will have been utilized. The principle therefore involves the synthesizing of antenna patterns and is of wide applicability.

Side lobe suppression may be achieved, for example, by one or more different types of parameter modulation. Different antenna patterns may be established concurrently, or like patterns established concurrently, or like patterns established at different directions in space, for a single antenna.

No inherent limitations are imposed on this technique due to the region of the frequency spectrum which is employed. The over-all system is based on the variation of transducer parameters with time, and consequently is not sensitive to propagating media or to operating wavelengths. As a result, the technique can be used with substantially all forms of transducers, including reflectors, horns, radiating apertures, dipoles, and lenses and other optical or optically-equivalent devices.

What is claimed is:

1. Apparatus for reducing side lobe response in a directive receiving system comprising:
    (a) an antenna array formed of a rectangular microwave waveguide having a plurality of slot antenna elements in a wall thereof, said slot antenna elements being evenly distributed along said waveguide, said antenna array having a feed point centrally located intermediate the ends of said waveguide;
    (b) a source of a microwave signal incident on said antenna array;
    (c) a pair of electrically controllable microwave switching devices, each positioned along said waveguide at a predetermined distance between the center and a different end thereof, said switching devices being controllable to block microwave energy to effectively shorten the length of said antenna array;
    (d) a source of periodic switching signals coupled to said switching devices for modulating the effective length of said antenna array, said source operating said switching devices cyclically at a predetermined switching frequency for modulating said microwave signal to produce a plurality of signal components, one of said signal components being at the frequency of said microwave signal and the remaining signal components being separated in frequency therefrom in multiples of said switching frequency;
    (e) receiver means coupled to said antenna array and responsive to said microwave signal including said signal components;
    (f) a filter included in said receiver means and tuned to pass a single one of said signal components, the signal component passed by said filter being the signal component at the frequency of said microwave signal, the output of said filter being a signal having reduced contribution from the side lobes of said antenna array;
    (g) and utilization means coupled to said filter.

2. Apparatus for reducing side lobe response in a directive receiving system comprising:
    (a) a linear antenna array having a plurality of antenna elements and having a feed point centrally located intermediate the ends thereof;
    (b) a source of a received signal incident on said antenna array;
    (c) a pair of electrically controllable switching devices, each positioned along said linear array at a predetermined distance between the center and a different end thereof, said switching devices being controllable to block signal energy to effectively shorten the length of said antenna array;
    (d) a source of periodic switching signals coupled to said switching devices for modulating the effective length of said antenna array, said source operating said switching device cyclically at a predetermined switching frequency for modulating said received signal to produce a plurality of signal components, one of said signal components being at the frequency of said received signal and the remaining signal components being separated in frequency therefrom in multiples of said switching frequency;
    (e) receiver means coupled to said antenna array and responsive to said received signal including said signal components;
    (f) a filter included in said receiver means and tuned to pass a single one of said signal components, the signal component passed by said filter being the signal component at the frequency of said received signal, the output of said filter being a signal having reduced contribution from the side lobes of said antenna array;
    (g) and utilization means coupled to said filter.

3. Apparatus for reducing said lobe response in a directive receiving system comprising:
    (a) a linear antenna array having a plurality of antenna elements, said linear antenna array having a feed point centrally located intermediate the ends thereof;
    (b) a source of a received signal incident on said antenna array;
    (c) a pair of electrically controllable switching devices, each positioned along said linear array at a predetermined distance between the center and a different end thereof, said switching devices being controllable to block signal energy to effectively shorten the length of said antenna array;
    (d) a source of periodic switching signals coupled to said switching devices for modulating the effective length of said antenna array, said source operating said switching devices cyclically at a predetermined frequency for modulating said received signal to produce a plurality of signal components, one of said signal components being at the frequency of said received signal and the remaining signal components being separated in frequency therefrom in multiples of said switching frequency;
    (e) and receiver means coupled to said antenna array and including a filter tuned to pass a single one of said signal components, the signal component passed by said filter being the signal component at the frequency of said received signal, the output of said filter being a signal having reduced contribution from the side lobes of said antenna array, said receiver means including utilization means coupled to said filter.

4. Apparatus for reducing side lobe response in a directive receiving system comprising:
    (a) a linear antenna array for receiving electromagnetic wave energy and having a plurality of antenna elements, said linear antenna array having a feed point centrally located intermediate the ends thereof;
    (b) a pair of electrically controllable switching devices, each positioned along said linear array at a predetermined distance between the center and a different end thereof, said switching devices being controllable to block said electromagnetic wave energy to effectively shorten the length of said antenna array;

(c) a source of periodic switching signals coupled to said switching devices for modulating the effective length of said antenna array, said source operating said switching devices cyclically at a predetermined frequency for modulating said electromagnetic wave energy to produce a plurality of signal components, one of said signal components being at the frequency of said electromagnetic wave energy and the remaining signal components being separated in frequency therefrom in multiples of said switching frequency;

(d) and receiver means coupled to said antenna array and including a filter tuned to pass a single one of said signal components, the signal component passed by said filter being the signal component at the frequency of said electromagnetic wave energy, the output of said filter being a signal having reduced contribution from the side lobes of said antenna array, said receiver means including utilization means coupled to said filter.

5. Apparatus for reducing side lobe response in a directive receiving system comprising:

(a) a linear antenna array for receiving electromagnetic wave energy;

(b) electrically controllable modulating means coupled to said linear array for modulating the electrical length thereof;

(c) a source of periodic modulating signals coupled to said modulating means for controlling the modulation of the length of said antenna array, said source operating said modulating means cyclically at a predetermined frequency for modulating said electromagnetic wave energy to produce a plurality of signal components, one of said signal components being at the frequency of said electromagnetic wave energy and the remaining signal components being separated in frequency therefrom in multiples of said modulating frequency;

(d) and receiver means coupled to said antenna array and including a filter tuned to pass a single one of said signal components, the signal component passed by said filter being the signal component at the frequency of said electromagnetic wave energy, the output of said filter being a signal having reduced contribution from the side lobes of said antenna array, said receiver means including utilization means coupled to said filter.

6. Apparatus for modifying the directional response of an electromagnetic wave energy receiving system comprising:

(a) a multielement antenna array for receiving electromagnetic wave energy and having a directional response characteristic, said antenna array having a variable parameter affecting said directional response characteristic;

(b) electrically controllable modulating means coupled to said antenna array for modulating said variable parameter;

(c) a source of periodic modulating signals coupled to said modulating means for controlling the modulation of said variable parameter of said antenna array, said source operating said modulating means cyclically at a predetermined frequency for modulating said electromagnetic wave energy to produce a plurality of signal components, one of said signal components being at the frequency of said electromagnetic wave energy and the remaining signal components being separated in frequency therefrom in multiples of said modulating frequency;

(d) and receiver means coupled to said antenna array and including a filter tuned to pass a single one of said signal components, the signal component passed by said filter being the signal component at the frequency of said electromagnetic wave energy, the output of said filter being a signal having reduced contribution from the side lobes of said antenna array, said receiver means including utilization means coupled to said filter.

7. Apparatus for modifying the directional response of an electromagnetic wave energy receiving system comprising:

(a) an antenna for receiving electromagnetic wave energy and having a directional response characteristic, said antenna having a variable parameter affecting said directional response characteristic;

(b) electrically controllable modulating means coupled to said antenna for modulating said variable parameter;

(c) a source of periodic modulating signals coupled to said modulating means for controlling the modulation of said variable parameter of said antenna, said source operating said modulating means cyclically at a predetermined frequency for modulating said electromagnetic wave energy to produce a plurality of signal components, one of said signal components being at the frequency of said electromagnetic wave energy and the remaining signal components being separated in frequency therefrom in multiples of said modulating frequency;

(d) selective means coupled to said antenna and having a bandwidth adjusted to pass solely a predetermined one of said signal components, the ouput of said selective means being a signal having a modified directional response characteristic compared to that of said antenna;

(e) and utilization means coupled to said selective means.

8. Apparatus for modifying the directional response of an electromagnetic wave energy receiving system comprising:

(a) an antenna for receiving electromagnetic wave energy and having a directional response characteristic, said antenna having a plurality of variable elements affecting said directional response characteristic;

(b) electrically controllable modulating means coupled to said antenna for modulating said variable elements;

(c) a source of periodic modulating signals coupled to said modulating means for controlling the modulation of said variable elements, said source operating said modulating means cyclically at a predetermined frequency for modulating said electromagnetic wave energy to produce a plurality of signal components, one of said signal components being at the frequency of said electromagnetic wave energy and the remaining signal components being separated in frequency therefrom in multiples of said modulating frequency;

(d) frequency selective means coupled to said antenna for passing predetermined ones of said signal components, the output of said selective means being a plurality of signals having modified directional response characteristics compared to that of said antenna;

(e) and utilization means coupled to said frequency selective means.

9. Apparatus for modifying the directional response of an electromagnetic wave energy receiving system comprising:

(a) an antenna for receiving electromagnetic wave energy and having a directional response characteristic, said antenna having a variable parameter affecting said directional response characteristic;

(b) electrically controllable modulating means coupled to said antenna for modulating said variable parameter;

(c) a source of periodic modulating signals coupled to said modulating means for controlling the modulation of said variable parameter of said antenna, said source operating said modulating means cyclically at a predetermined frequency for modulating said electromagnetic wave energy to produce a plurality of signal components, one of said signal components being at the frequency of said electromagnetic wave energy and the remaining signal components being separated in frequency therefrom in multiples of said modulating frequency;

(d) frequency selective means coupled to said antenna for passing predetermined ones of said signal components, the output of said frequency selective means being a plurality of signals having a modified directional response characteristic compared to that of said antenna;

(e) and utilization means coupled to said frequency selective means.

10. Apparatus for modifying the directional response of an electromagnetic wave energy receiving system comprising:

(a) an antenna for receiving electromagnetic wave energy and having a directional response characteristic, said antenna having a variable parameter affecting said directional response characteristic;

(b) modulating means coupled to said antenna for cyclically modulating said variable parameter at a predetermined frequency to produce a plurality of signal components, one of said signal components being at the frequency of said electromagnetic wave energy and the remaining signal components being separated in frequency therefrom in multiples of said modulating frequency;

(c) frequency selective means coupled to said antenna and adjusted to pass a predetermined one of said signal components, the output of said frequency selective means being a signal having a modified directional response characteristic compared to that of said antenna;

(d) and utilization means coupled to said frequency selective means.

References Cited by the Examiner

UNITED STATES PATENTS 2,638,585  5/1953  Priest _____ 343—7
2,831,190  5/1958  Trinter.

CHESTER L. JUSTUS, *Primary Examiner.*

KATHLEEN CLAFFY, *Examiner.*